United States Patent [19]

Kawamura

[11] Patent Number: 4,726,191
[45] Date of Patent: Feb. 23, 1988

[54] SEA WATER WELL AND AQUACULTURE PRESERVE, AND THE COMBINATION WITH A POWER GENERATION SYSTEM

[76] Inventor: Bruce K. Kawamura, 1059 Kilauea Ave., Hilo, Hi. 96720

[21] Appl. No.: 864,355

[22] Filed: May 19, 1986

[51] Int. Cl.⁴ .............................................. F03G 7/04
[52] U.S. Cl. .................................. 60/641.7; 165/45
[58] Field of Search ........................ 60/641.7; 165/45

[56] References Cited

U.S. PATENT DOCUMENTS

| | | | |
|---|---|---|---|
| 1,493,368 | 5/1924 | Merz | 60/641.6 |
| 2,165,854 | 7/1939 | Headrick | 165/45 |
| 2,323,122 | 6/1943 | Crawford | 165/45 |
| 2,461,449 | 2/1949 | Smith et al. | 60/641.7 X |
| 3,953,971 | 5/1976 | Parker . | |
| 4,050,252 | 9/1977 | Nakanishi . | |
| 4,055,145 | 10/1977 | Mager | 60/641.7 X |
| 4,087,975 | 5/1978 | Owens . | |
| 4,214,449 | 7/1980 | Sorenson . | |
| 4,245,475 | 1/1981 | Girden . | |
| 4,311,012 | 1/1982 | Finley . | |
| 4,312,288 | 1/1982 | Finsterwalder et al. . | |
| 4,430,861 | 2/1984 | Avery . | |
| 4,450,689 | 5/1984 | Moe . | |
| 4,537,030 | 8/1985 | Berman . | |

*Primary Examiner*—Allen M. Ostrager
*Attorney, Agent, or Firm*—Pennie & Edmonds

[57] ABSTRACT

A power generation system of the ocean thermal energy conversion type including one of a closed or open system and a working fluid capable of undergoing a change in state from a liquid to a vapor state and back to the liquid state after expansion. The system includes an evaporator and a condenser, and a liquid line communicating a liquid (ocean water) at a required temperature to cause condensation of the working fluid after the working fluid has been evaporated and expanded through a turbine. The liquid line in communication with cold water is characterized by a well disposed in solid land adjacent the ocean and the direct supply of water either comprising a working fluid or for evaporating the working fluid. Water flow from the system may be released to an aquaculture preserve.

9 Claims, 3 Drawing Figures

SEA WATER WELL AND AQUACULTURE PRESERVE, AND THE COMBINATION WITH A POWER GENERATION SYSTEM

TECHNICAL FIELD

The present invention concerns apparatus for ocean thermal energy conversion and the generation of power. The invention also concerns the use of the water outflow from the apparatus with an aquaculture operation.

BACKGROUND OF THE INVENTION

The generation of power by the conversion to useful work of potential energy represented by the difference in temperatures between surface water and water at some depth below the surface is known. Typically, the operation is carried out using surface water having a temperature of at least about 21° C. and more likely a temperature of about 30° C. or perhaps higher, while the water taken at some depth, for example, 2,000 feet or more below the surface will have a temperature of no more than about 10° C. These temperature differences in waters at different levels generally will be found in tropical and sub-tropical ocean regions.

Systems for the generation of power using water taken from different depths and having different temperatures have been characterized as ocean thermal energy conversion (OTEC) systems. The OTEC systems are known to include a closed cycle thermodynamic system having a working fluid that is evaporated following heat interchange between the warm surface water taken from an adjacent ocean region, expanded through a turbine to a lower pressure and, thereafter, condensed by the transfer of its latent heat of evaporation to the cold ocean water pumped from a lower ocean depth. It has been suggested that the working fluid may include propane, ethane, ammonia or n-hexane to name a few. These working fluids all have boiling points suitably lower than that of water at the same pressure.

Typical of the prior art which discloses a system of the aforementioned type are U.S. Pat. Nos. 4,055,145 (Mager et al) and 4,450,689 (Moe). Another prior art system of somewhat similar nature is U.S. Pat. No. 4,087,975 (Owens).

U.S. Pat. No. 4,050,262 (Nakanishi) discloses a system for the generation of power that uses discharge water, previously used as a coolant in a nuclear reactor in place of warm surface water in heat exchange with a working fluid to evaporate the working fluid. As previously discussed, the working fluid then is expanded within the closed system, and cold ocean water is used to condense the evaporated, expanded working fluid by transfer of the latent heat of evaporation.

The OTEC Systems also include an open cycle energy conversion system which utilizes warm ocean water as a working fluid. To this end, the warm ocean water is introduced into a low pressure evaporator within which a small portion of the water flashes into water vapor. The water vapor is expanded through a turbine to a lower pressure and, then condensed by cold ocean water. Another form of open cycle energy conversion system may be characterized as a mist generating system which produces a water head that can be used to drive a hydro-electric generator.

In order to derive the cold ocean water, the closed cycle systems of the prior art use a pipe which communicates at one end within a heat exchanger of the closed cycle system and extends to an open end at the proper depth for entry of water. As indicated, the depth may be about 2,000 feet or more and the pipe may extend off shore along the shore line and ocean floor, through a distance of about one mile, or so. Both OTEC Systems use a pipe which may be a polyethylene tube.

The water that shall enter the pipe is pumped to the surface for use with the land based power generation facility along the shoreline. In the event that the power generation facility is a water based facility having its situs in the water, as a floating structure, then the pipe which communicates with the power generation facility will extend downward through the ocean water to the proper depth.

The prior art has recognized that there may be problems attendant to the use of pipes disposed as previously discussed. These problems may have their genesis in an exposure of the pipe to forces induced by unfavorable wave, current and wind conditions. In addition, the pipe may create a hazard in navigable waters. Further still, the size of pipe to provide the water required may be enormous, to render costs of material and operation prohibitive. In an article appearing in the Honolulu Star Bulletin, dated May 8, 1986, Section B, page 6, it was stated "[T]he plant (referring to a 100-megawatt plant) would also call for (sic) cold water intake pipe 80 feet in diameter, running 8,000 feet offshore and 3,000 feet down."

According to the prior art, the problems induced by unfavorable wave, current and wind conditions may be overcome by strengthening the connection of the pipe to the floating structure to withstand conditions of stress. See, for example, U.S. Pat. No. 4,312,288 (Finsterwalder et al). The problem of exposure of the pipe installed from the shoreline, along the ocean floor, is also addressed by Moe. According to Moe, the adverse effects on pipes which communicate ocean water from a depth, or for that matter from the surface of the ocean, to provide a source of warm and cold water to respective heat exchangers in a closed cycle thermodynamic system may be overcome by locating each heat exchanger in a separate cavity of the closed system and communicating the inflows and outflows of water between the heat exchangers and the water source. The cavities, according to Moe, are located in a rock area along the ocean floor, adjacent to the water source having sufficient depth to provide the required temperature differential, and the pipes are disposed so that their inlets and outlets extend through the rock area slightly into the water source at appropriate locations along the rock area.

SUMMARY OF THE INVENTION

The present invention seeks to overcome the problems in ocean thermal energy conversion systems recognized by both Finsterwalder et al and Moe by the provision of an in-ground pipe or a number of in-ground pipes operating in tandem which communicate water at a temperature sufficiently low for condensing a vaporized expanded working fluid to the liquid state. Each pipe may be characterized by a well and well casing dug in the solid land adjacent the ocean and comprises the direct supply of water used in the condensation of the working fluid of an OTEC System of either closed or open type. The water following use in the system, rich in nutrient value, is discharged into a reservoir comprising an aquaculture preserve.

Each well may be located in the solid land to extend to the source of water along any one of a vertical, angled or arcuate, "snaked" orientation.

By use of a well, or a number of wells operating in tandem to communicate water to a condenser to condense a working fluid several important objectives are reached. To this end, the communication path for water is not subject to problems arising from unfavorable wave, current and wind conditions, and the well causes no hazard to navigation. Further, the water communicated to the condenser heat exchanger is substantially pollutant-free. In addition, the material cost in locating the communicating water path in a well as opposed to locating the same water path along the ocean floor is less, and greater depths may be reached more economically than by laying pipe or tubes on the ocean floor. Also, it is expected that the same volume of water may be brought from a well or several wells in tandem as may be brought from the source through a pipe of the size mentioned.

Other advantages of the invention will become clear as the description to be read in conjunction with a view of the drawing figures continues.

DESCRIPTION OF THE PREFERRED EMBODIMENT OF THE INVENTION

Figure 2:
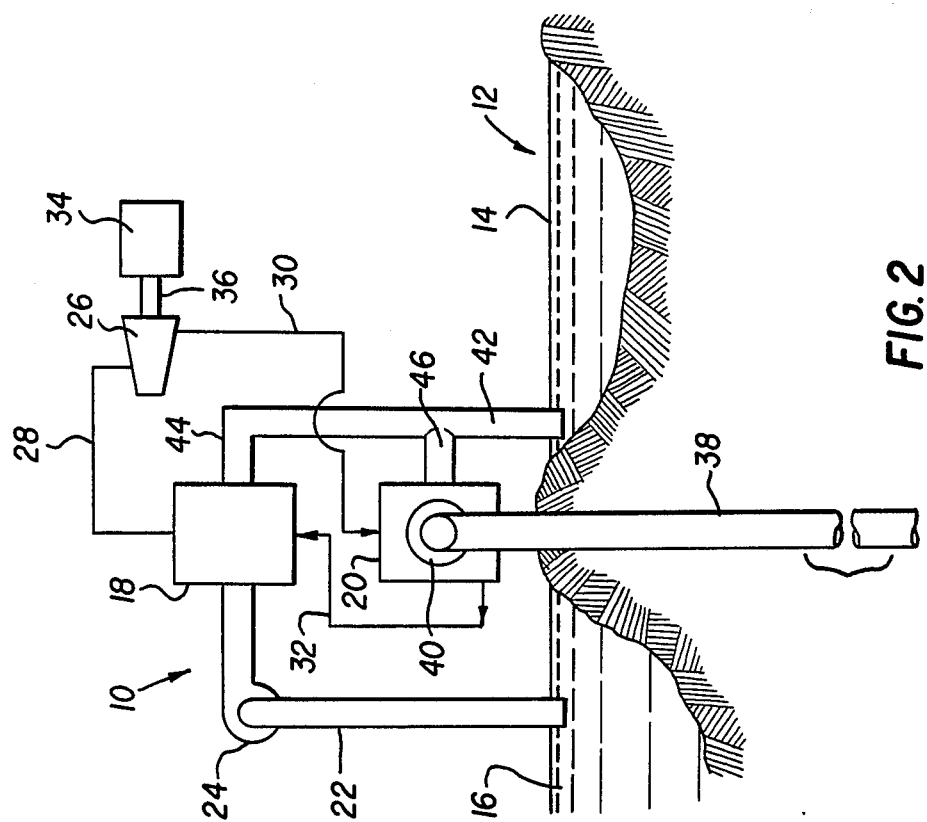
FIG. 2 is an enlarged schematic view of the system for power generation together with an aqauculture lagoon.

With reference first to FIG. 2, there is illustrated an ocean thermal energy conversion system for generation of power and an associated aquaculture operation. The system for power generation illustrated as a typical closed cycle system, is generally identified by the numeral 10, while an aquaculture operation is identified by the numeral 12. The aquaculture operation may be carried out in a lagoon 14 or man-made reservoir located alongside the ocean 16.

The system for power generation includes a heat exchanger 18 and a heat exchanger 20 similar in design and operation. Both heat exchangers act upon a working fluid in a closed circuit. The working fluid in the system is one capable of undergoing vaporization from a liquid state, expansion and, then, condensation from the expanded, vapor state to that of the liquid state, once again. A working fluid, such as ammonia may be used.

Systems for power generation which convert the useful work of potential energy represented by the difference in temperature between ocean water at or near the surface and water at some depth below the surface, as illustrated in FIG. 2, generally operate in the following manner. To this end, a pipe 22 is connected between heat exchanger 18 and the ocean water for purposes of communicating water to the heat exchanger. Pipe 22 comprises an intake pipe and a pump 24 functions to pump the water to the heat exchanger. Heat exchanger 18 cooperates with an evaporator (not shown, but a part of a closed system which also includes a condenser) to vaporize the working fluid which is expanded in turbine 26.

The closed system includes various connections including pipe 28 between the evaporator of heat exchanger 18 and turbine 26, pipe 30 between the turbine and the condenser of heat exchanger 20, and pipe 32 between the condenser and evaporator of the respective heat exchangers. A power output is provided by generator 34 connected by an output shaft 36 to the turbine.

The complete operation includes a change of state of the working fluid from that of a liquid, to a vaporized, expanded state and, once again, to the liquid state prior to a second and each subsequent cycle of operation. To this end, heat exchanger 20 in cooperative arrangement with the condenser is connected to a source of ocean water at a temperature sufficiently cold to cause a rapid condensation of the expanded, vaporized working fluid. The water communicated to heat exchanger 18 may be at a temperature of about 30° C., and the water communicated to heat exchanger 20 may be at a temperature of about 10° C. The connection between heat exchanger 20 and the source of cold water is completed by an intake pipe 38. The water is pumped to the heat exchanger by a pump 40.

The outflow of water from heat exchanger 18 and heat exchanger 20 is connected to pipe 42 providing an outlet to lagoon 12. The connecting pipes include a pipe 44 and a pipe 46. The water discharged to the outlet pipe 42 will be at a temperature between the temperatures at the inlet to each heat exchanger.

As may be apparent the pipe 38, rather than being disposed along the shoreline and ocean floor to communicate cold water to heat exchanger 20, is located within a well (see FIG. 3) in the land surface. In the broadest definition of the invention, the heat exchanger 20 may be used in either a closed or open cycle system to condense the working fluid.

The location of the pipe in a land surface successfully overcomes the problems sustained by pipes and pumps from ocean waves and currents, and it avoids any possible hazard to water traffic in navigable waters. Also, the location of the pipe in a land surface is believed to result in a savings of material costs since a shorter length of pipe for water intake is required to reach the same depth. Further it is considered that colder water may be obtained from greater depths more economically than by laying pipe on the ocean floor.

Figure 1:
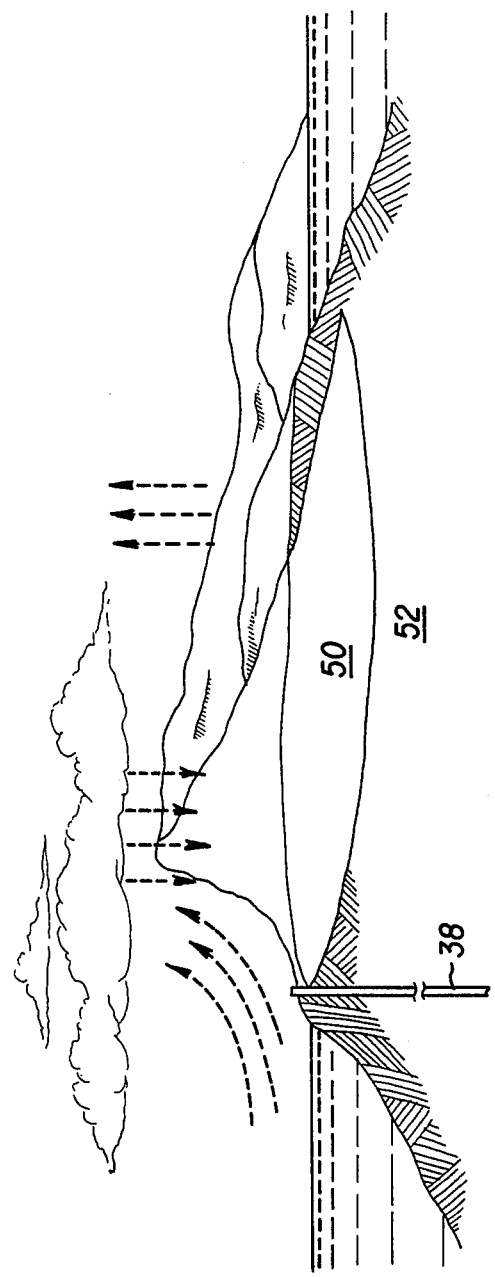
FIG. 1 is a schematic view in elevation of a coastal topography at which an ocean thermal energy conversion system may be located.

Turning now to FIG. 1, there is a schematic showing of the coast and coastal range which may be typical in some tropical and sub-tropical regions, such as the Hawaiian Archipelago. As a natural occurrence, there is evaporation to the atmosphere from warm water, and the formation of clouds with rain that falls along the coastal range and inland. As is typical in this area of the world, the rain water percolates through the ground forming a body 50 of fresh water below the surface at various locales. The fresh water body may have a lens-like contour and normally floats on sea water which not only surrounds the land mass but also fills the voids 52 therebelow. A zone of mixture separates the freshwater body and sea water. The upper surface of the body of fresh water may be located from a foot to several tens of feet above the mean sea level, and for every foot that the fresh water body stands above the mean sea level there will be a depression of about forty feet in the underlying salt water.

According to the invention, sea water may be obtained from a well or series of wells, in tandem, drilled to a depth below the freshwater body. Deep wells may be drilled vertically since the intrusion of fresh water will not become a factor. Wells having less depth may be drilled at a seaward angle, or by "snaking" the well along a radius of curvature to avoid the freshwater body. The angle of the well, or the amount of curvature will be determined by the particular depth of the well required to reach the ocean water at the temperature desired.

Figure 3:
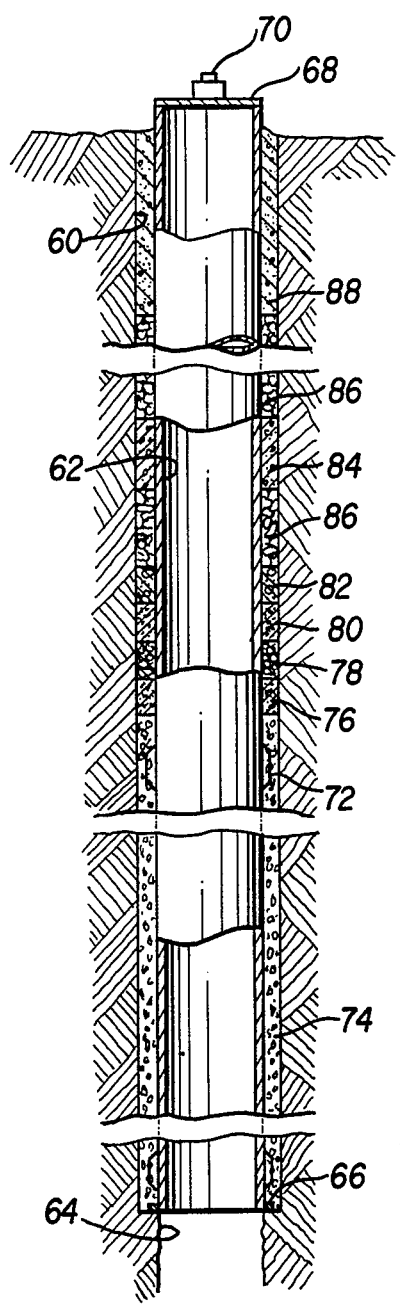
FIG. 3 is a sectional view of a well for communicating ocean water to the power generation system.

A well 60 for pipe 38 may be seen in FIG. 3. The well 60 is typical of each well in the event that a series of wells are located in tandem. The pipe 38, below ground, may be characterized as a well casing 62. The well may be dug to any depth below the freshwater body in order to reach ocean water at the desired temperature. For example, a vertical well may be dug to a depth of about 700 feet or more. An angled well or a well in "snaked" orientation may be dug to other depths. FIG. 3 illustrates an open hole 64 which extends below the length of the well to create a reservoir for water to be pumped. The open hole normally has a diameter less than the inner diameter of well casing 62 and preferably is dug following installation of well casing 62.

The in ground well provides an additional advantage for systems for power generation in that the water to be pumped is not directly exposed to pollutants and debris in the ocean as may be the case with water to be pumped through pipes which extend from the shoreline and along the ocean floor.

The internal diameter of the well 60 will be greater by a few inches than the outer diameter of the casing 62. As such, an annular space is provided around the casing. The annular space is used in the stabilization of the casing by packing to be described. The manner by which the well is dug is well known and outside the scope of the invention.

According to the invention, the well casing may be steel, such as a corrosion resistant steel. Preferably the steel will have four to six times the atmospheric corrosion resistance of structural carbon steel. The steel will conform to ASTM designation A-242. Without any intent to limit the invention, but to describe a preferred embodiment of the same, the casing will be solid having a wall thickness of about 0.3125 inch, an inside diameter of about 16 inches and formed from individual casing lengths. The individual lengths will have bevelled ends suitable for butt welding. A casing shoe 66 is supported on the bottom length of casing to support the casing at the bottom of the well. The well casing may be closed by a plate 68 including a coupling 70 for connection with pipe 38. In addition, casing guides 72 may be located along the outside surface of the casing at thirty foot intervals, for example. Preferably, there will be three casing guides arranged at 120° intervals for each section. The casing guides will be vertically aligned in the annular space, preferably in an ungrouted region.

The annular space between the well casing 62 and the well 60 receives cement-grouting, rock stabilization and filter packing. To this end, a filter pack of gravel 74 may be located in the base of the well. The layer of filter pack gravel will extend to a height of about 75 feet in a well having a depth of about 700 feet. The filter pack gravel may consist of sound, durable, water worn, well-rounded particles of uniform size having an average specific gravity of not less than 2.5. The size of gravel will be determined by the dimension of the annular space which should exceed about 3 inches. A seal should extend throughout the next 8 feet or so. The seal should consist of individual two-foot layers of material including course aggregate 76, topped by fine aggregate 78, sand 80 and a concrete mix 82. The next 450 feet or so of annular space will be filled with cement grout 84 including a mixture of Portland cement, rock sand and water. If, at any particular location, there is a loss of the cement grout, the annular space at that location should be filled with rock stabilization 86. Thus, there may be intervals of cement grout and rock stabilization. The annular space throughout the last 150 feet or so of the well will be filled with cement grout 88.

What is claimed is:

1. In combination:
   (a) a power generation apparatus including
      (1) a system having
         (i) an evaporator means for evaporating a working fluid which exists partially in a liquid state and adapted to be vaporized, expanded and returned to said liquid state within said system,
         (ii) a condenser means for condensing the evaporated working fluid, and
         (iii) an expansion means for expanding the working fluid, and
      (2) fluid flow means including
         (i) a first inlet conduit for communicating sea water at a first temperature to said evaporator means, said sea water at said first temperature providing the necessary heat to evaporate said working fluid,
         (ii) a second inlet conduit for communicating sea water at a second temperature to said condenser means, said second temperature being lower than said first temperature by an amount sufficient to condense the evaporated, expanded working fluid, and
         (iii) an outlet conduit for sea water connecting with said evaporator means and said condenser means,
      (3) well means forming said second inlet conduit, said well means being located in the solid land mass to extend below a surface to a depth at which an open end of said well means is located within a body of said sea water at said second temperature as shall have filled a void in said solid land mass, and
      (4) an aquaculture preserved in the form of a reservoir for retention of sea water and marine life to be cultivated, said outlet conduit for passing said sea water communicating with said reservoir whereby said sea water from said system replenishes said reservoir to nourish all marine life therein.

2. The combination of claim 1 wherein said second temperature is about 10° C.

3. The combination of a well located in a mass of solid land adjacent a body of sea water, said well extending to said sea water that shall fill one or more voids below the surface of said land mass at a depth that said sea water is rich in nutrient value, an aquaculture preserve, and means for communicating sea water drawn from said well to said aquaculture preserve at a controlled temperature of use, said sea water providing said nutrient value for marine life to be cultivated in said aquaculture preserve.

4. The combination of claim 3 wherein said well extends substantially vertically from said surface.

5. The combination of claim 3 wherein said well extends at an angle from said surface toward said body of sea water.

6. The combination of claim 3 wherein said well extends along an arcuate path from said surface toward said body of sea water.

7. The combination of claim 4, or 5, or 6 wherein said well includes an inner wall, a casing within said inner wall having an outer wall spaced from said inner wall to provide a space, and a packing within said space throughout the depth of said well to support said casing.

8. The combination of claim 3 wherein said communicating means includes one of a closed and open system of power generation apparatus.

9. The combination of claim 3 wherein said well extends to a depth to communicate with sea water at a temperature of about 10° C., and said communicating means includes means to control said sea water temperature to a temperature above 10° C.

* * * * *